United States Patent
Yamamoto et al.

(10) Patent No.: US 10,060,734 B2
(45) Date of Patent: Aug. 28, 2018

(54) DIMENSION MEASUREMENT DEVICE, DIMENSION MEASUREMENT METHOD, DIMENSION MEASUREMENT SYSTEM, AND PROGRAM

(71) Applicant: Panasonic Intellectual Property Management Co., Ltd., Osaka (JP)

(72) Inventors: Harumi Yamamoto, Osaka (JP); Hajime Jikihara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 72 days.

(21) Appl. No.: 15/025,736

(22) PCT Filed: Sep. 26, 2014

(86) PCT No.: PCT/JP2014/004938
§ 371 (c)(1),
(2) Date: Mar. 30, 2016

(87) PCT Pub. No.: WO2015/049853
PCT Pub. Date: Apr. 9, 2015

(65) Prior Publication Data
US 2016/0245644 A1 Aug. 25, 2016

(30) Foreign Application Priority Data
Oct. 2, 2013 (JP) .................. 2013-207635

(51) Int. Cl.
*G01B 11/25* (2006.01)
*G01S 17/89* (2006.01)
*G01B 11/24* (2006.01)

(52) U.S. Cl.
CPC .......... *G01B 11/2518* (2013.01); *G01B 11/24* (2013.01); *G01B 11/2545* (2013.01); *G01S 17/89* (2013.01)

(58) Field of Classification Search
CPC . G01B 11/2518; G01B 11/2545; G01B 11/24; G01S 17/89
See application file for complete search history.

(56) References Cited

U.S. PATENT DOCUMENTS 5,475,507 A    12/1995   Suzuki et al.
5,974,175 A * 10/1999   Suzuki .................. G06K 9/48
                                                                                                   382/103

(Continued)

FOREIGN PATENT DOCUMENTS

JP    H06-203157 A    7/1994
JP    2000-076454 A    3/2000

(Continued)

OTHER PUBLICATIONS

International Search Report issued in Application No. PCT/JP2014/004938 dated Nov. 11, 2014, with English translation.

*Primary Examiner* — Sang Nguyen
(74) *Attorney, Agent, or Firm* — McDermott Will & Emery LLP

(57) ABSTRACT

The dimension measurement device of one aspect of the present invention includes: an obtainer configured to obtain, from a measurement device for performing three dimensional measurement of a desired object, a set of coordinates in three dimensions of the desired object; a surface extractor configured to determine a focused surface constituting the desired object based on the set of coordinates, and extract a position of a boundary of the focused surface; a region extractor configured to extract, in relation to a candidate region corresponding to an object being a specific object attached to the focused surface, a position of an edge surrounding the candidate region; and a dimension generator configured to generate dimensional data necessary for cre- (Continued)

ating a dimensional drawing of the desired object from the position of the boundary and the position of the edge.

14 Claims, 12 Drawing Sheets

(56) References Cited

U.S. PATENT DOCUMENTS

| | | | | |
|---|---|---|---|---|
| 6,021,221 | A * | 2/2000 | Takaha | G06F 3/04845 382/164 |
| 6,674,905 | B1 * | 1/2004 | Matsugu | G06T 7/11 382/181 |
| 6,934,414 | B2 * | 8/2005 | Kondo | G06K 9/00362 382/194 |
| 7,970,207 | B2 * | 6/2011 | Jin | G06K 9/00664 382/162 |
| 8,774,524 | B2 * | 7/2014 | Tsunematsu | G06K 9/4638 382/197 |
| 2001/0024514 | A1 | 9/2001 | Matsunaga | |
| 2002/0030676 | A1 * | 3/2002 | Harada | G06T 17/20 345/419 |
| 2002/0107674 | A1 * | 8/2002 | Bascle | G06F 3/011 703/1 |
| 2003/0043147 | A1 * | 3/2003 | Heim | G06T 15/40 345/421 |
| 2005/0168460 | A1 * | 8/2005 | Razdan | G06F 17/30398 345/419 |
| 2007/0165244 | A1 * | 7/2007 | Yukhin | G06K 9/00255 356/603 |
| 2009/0285460 | A1 * | 11/2009 | Ishikawa | G06K 9/48 382/128 |
| 2010/0217416 | A1 * | 8/2010 | Murabata | G05B 19/4093 700/98 |
| 2012/0099798 | A1 * | 4/2012 | Saruta | G01B 11/002 382/203 |
| 2014/0307085 | A1 * | 10/2014 | Ohsawa | G01B 11/026 348/136 |
| 2014/0313254 | A1 * | 10/2014 | Sohgawa | B41J 3/4073 347/14 |

FOREIGN PATENT DOCUMENTS

| | | |
|---|---|---|
| JP | 2001-266123 A | 9/2001 |
| JP | 2001-282870 A | 10/2001 |
| JP | 2003-194530 A | 7/2003 |
| JP | 2004-012221 A | 1/2004 |
| JP | 2008-071076 A | 3/2008 |
| JP | 2008-077261 A | 4/2008 |
| JP | 2012-037257 A | 2/2012 |
| JP | 2012-230594 A | 11/2012 |

* cited by examiner

Please select Flat Surface to be edited
  ┌─────────────────────────────┐ ┌─────────┐
  │ Flat Surface 1           ▼  │ │ Preview │
  └─────────────────────────────┘ └─────────┘
     Width for displaying group of points [   5 ] mm
  ────────────────────────────────────────────────
  Please select object to be cut-out
    ◉ Opening (e.g., Windows, Doors, Balconies)
    ◎ Wiring Fixture (e.g., Outlets, Switches)
    ◎ Others (Rectangles)
    ◎ Others (Circles)
  ────────────────────────────────────────────────
  Please set conditions for cut-out
     Cut-out Width         [   5 ] mm
     Scanning Pitch        [   5 ] mm
     Edge Setting          [   5 ] mm ┌──────────────┐  ┌───────────────┐  ┌─────┐
  │ Cut-out fitting│ │ Execute cut-out│ │ End │
  └──────────────┘  └───────────────┘  └─────┘
```

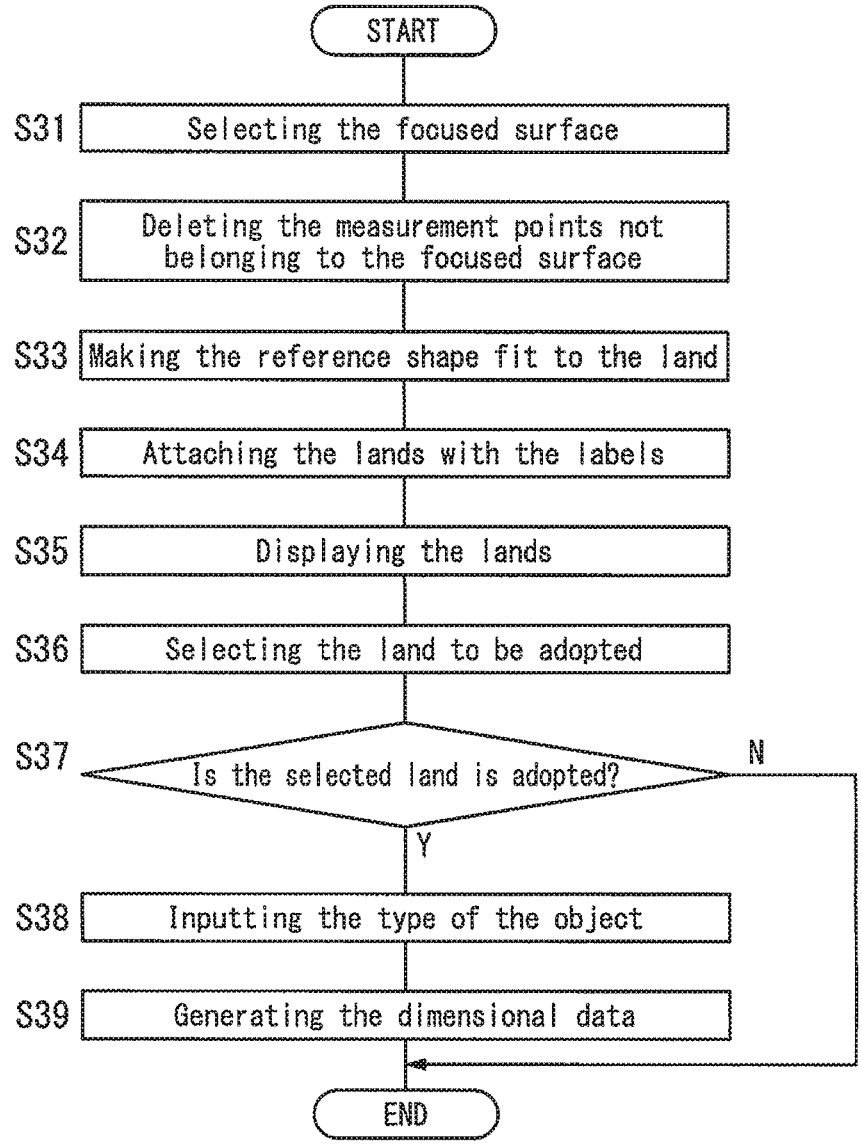

.# DIMENSION MEASUREMENT DEVICE, DIMENSION MEASUREMENT METHOD, DIMENSION MEASUREMENT SYSTEM, AND PROGRAM

RELATED APPLICATIONS

This application is the U.S. National Phase under 35 U.S.C. § 371 of International Application No. PCT/JP2014/004938, filed on Sep. 26, 2014, which in turn claims the benefit of Japanese Application No. 2013-207635, filed on Oct. 2, 2013, the disclosures of which are incorporated by reference herein.

TECHNICAL FIELD

The present invention would relate to dimension measurement devices, dimension measurement methods, dimension measurement systems, and programs. In particular, the present would relate to a dimension measurement device for measuring dimensions of a desired object based on coordinates obtained by three dimensional measurement, a dimension measurement method which would be performed by this dimension measurement device, a dimension measurement system including this dimension measurement device, and a program for realizing this dimension measurement device.

BACKGROUND ART

There has been proposed a technique of performing three dimensional measurement of a desired object and creating a three dimensional model from measured data (e.g., disclosed in Document 1 [JP 2012-230594 A]). Document 1 discloses that, to create the three dimensional model of the desired object, surfaces constituting the desired object are obtained from positional data of a group of three dimensional points obtained by measurement with a laser scanner and intersections of the surfaces are calculated as outlines. In the process of obtaining the surfaces constituting the desired object, a non surface region which does not correspond to a flat or curved surface is excluded, and thereafter the surfaces are attached with labels and then continuous ones of the surfaces are unified based on the attached labels. Further, to create the three dimensional model, the technique disclosed in Document 1 obtains surfaces from the positional data of the group of three dimensional points which does not include points of the non surface regions, and further obtains boundaries of the surfaces obtained.

In some cases, for maintenance and repair of existing buildings and the like, estimation of requisite amounts of materials (e.g., interior cloth) would be required. In such estimation, it is necessary to determine whether materials are necessary for each part, and to determine amounts of the materials for each part. However, the technique disclosed in Document 1 only divides the surfaces based on the boundaries of the surfaces. Therefore, the three dimensional model created by this technique would not be useful for accurate estimation of requisite amounts of materials. To achieve such a purpose, it would be necessary to create an accurate dimensional drawing of the desired object.

SUMMARY OF INVENTION

The objective of the present invention would be to propose a dimension measurement device capable of creating a more accurate dimensional drawing of a desired object. The alternative objectives of the present invention would be to propose a dimension measurement method which would be performed by this dimension measurement device, a dimension measurement system including this dimension measurement device, and a program for realizing this dimension measurement device.

The dimension measurement device of one aspect of the present invention includes: an obtainer configured to obtain, from a measurement device for performing three dimensional measurement of a desired object, a set of coordinates in three dimensions of the desired object; a surface extractor configured to determine a focused surface constituting the desired object based on the set of coordinates, and extract a position of a boundary of the focused surface; a region extractor configured to extract, in relation to a candidate region corresponding to an object being a specific object attached to the focused surface, a position of an edge surrounding the candidate region; and a dimension generator configured to generate dimensional data necessary for creating a dimensional drawing of the desired object from the position of the boundary and the position of the edge.

BRIEF DESCRIPTION OF DRAWINGS

FIG. 5 is a diagram illustrating a window used in the dimension measurement device of Embodiment 1.

FIG. 12 is a flowchart of an operation of a dimension measurement device of Embodiment 3.

DESCRIPTION OF EMBODIMENTS

Embodiment 1

Figure 1:
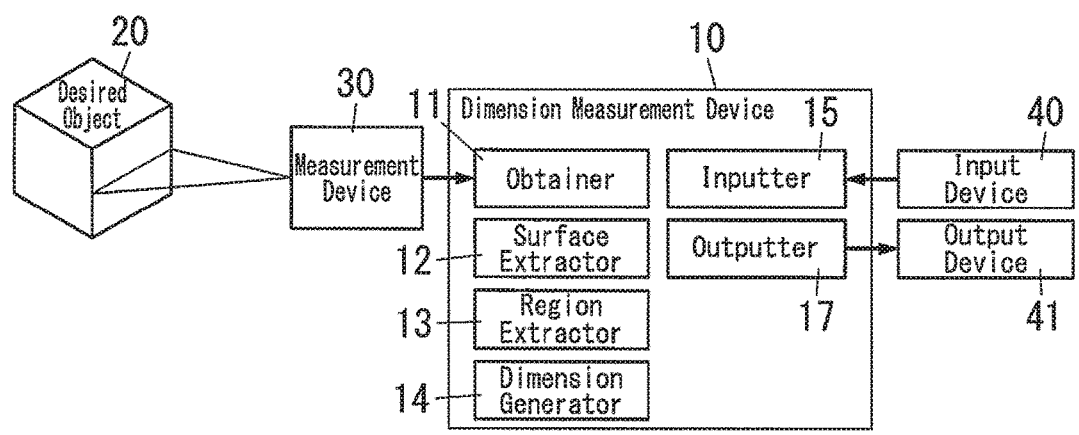
FIG. 1 is a block diagram of a dimension measurement device of Embodiment 1.
Figure 2:
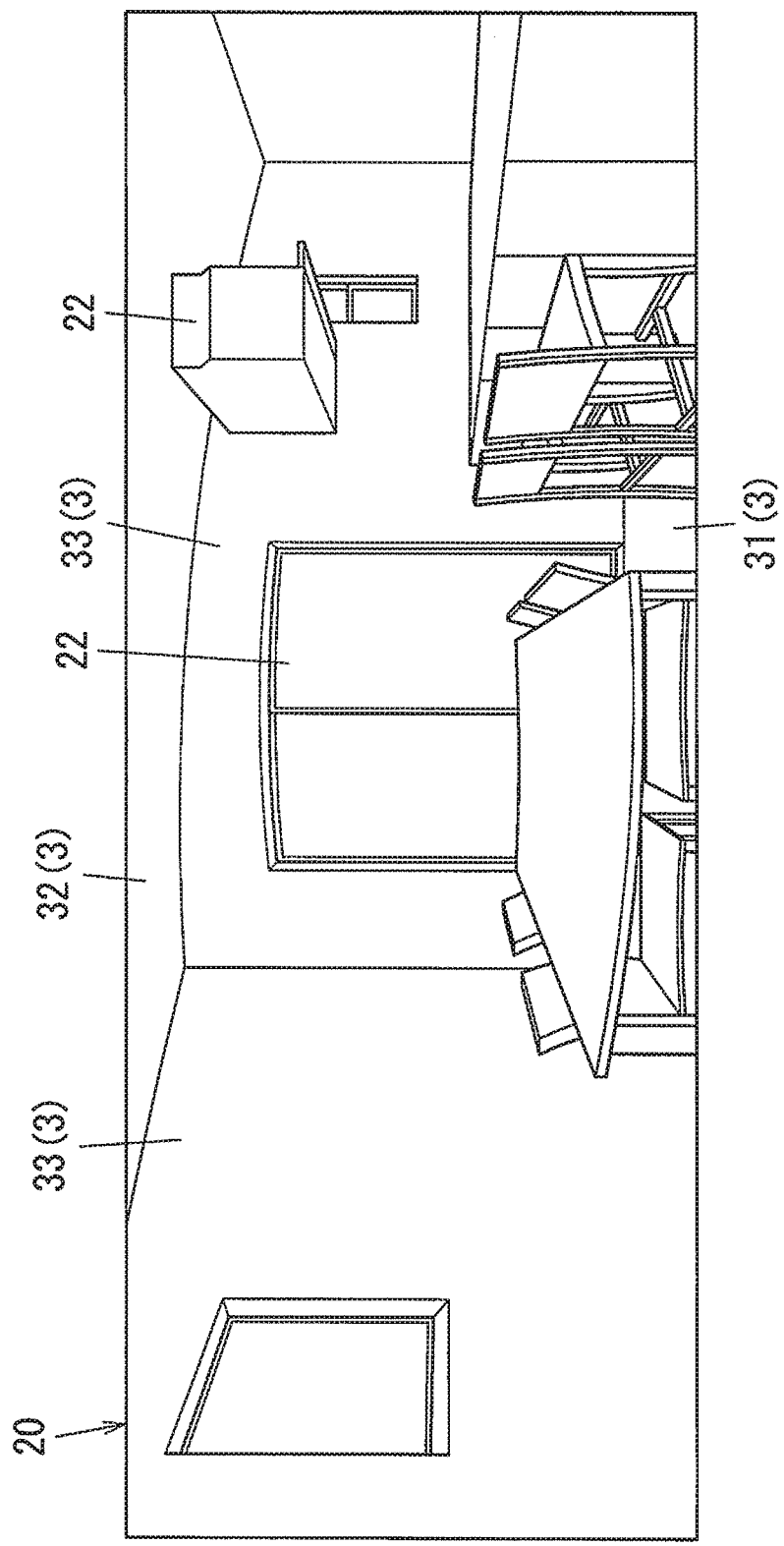
FIG. 2 is a diagram illustrating an example of the operation of the dimension measurement device of Embodiment 1.

As shown in FIG. 1, a dimension measurement system 1 described below includes a measurement device 30 configured to perform three dimensional measurement of a desired object 20 (shown in FIG. 2), and a dimension measurement device 10 configured to measure one or more dimensions of the desired object 20 based on a result of the three dimensional measurement of the desired object 20. In Embodiments 1 to 3, as shown in FIG. 2, the desired object 20 to be subjected to the three dimensional measurement is supposed to be a room constructed inside a building. However, the desired object 20 may be present inside or outside the building. Techniques described below are applicable to the desired object 20 other than the building.

The measurement device 30 for performing three dimensional measurement may be a 3D laser scanner, for example. The 3D laser scanner is configured to scan a desired object with a beam of a pulse laser three dimensionally, and output a set of three dimensional coordinates of a part (position) irradiated with the beam of the pulse laser based on a time difference (time of flight) from the time of emitting light to the time of receiving light. The set of three dimensional coordinates outputted from the measurement device 30 is coordinates in an orthogonal coordinate system. The coordinate system of the measurement device 30 is set irrespective of a location of the desired object 20. For example, the z-axis is set to correspond to the vertical direction, and a reference point is set to a sea level. Alternatively, a plane where the measurement device 30 is situated may be set to an xy-plane.

The measurement device 30 outputs a set of three dimensional coordinates for each point of the desired object 20 which is irradiated with the beam of the pulse laser. In summary, the measurement device 30 outputs measurement data indicative of the set of three dimensional coordinates of a point of the desired object 20. Hereinafter, the position to give the data on the three dimensional coordinates is referred to as a measurement point. Further, the data on the three dimensional coordinates outputted from the measurement device 30 is referred to as first data. The measurement device 30 with configuration like the above can give the three dimensional coordinates at an accuracy of about 1 mm.

The measurement device 30 may not measure the time of flight but may apply a principle of a triangulation method. Note that, the measurement device 30 may not be limited to use irradiation with the beam of the pulse laser, but may project a linear, stripe, or grid pattern of light, or may apply a stereo image method. Additionally, the measurement device 30 may be configured to emit intensity-modulated light whose intensity changes with time in accordance with a predetermine pattern, and receive reflected light from a space irradiated with the intensity-modulated light, and calculate a phase difference between the emitted intensity-modulated light and the received intensity-modulated light, and calculate time of flight from the phase difference. As such a configuration, it has been known a distance image sensor which receives light with an area image sensor to give pixel values as distance values.

Further, the measurement device 30 preferably may include a function to take an image of the desired object 20 in addition to a function of performing three dimensional measurement. For example, the measurement device 30 may include a solid-state image sensing device such as a CCD image sensor and a CMOS image sensor, and a wide angle optical system placed in front of the solid-state image sensing device to ensure a field of view covering an area scanned with a pulse laser to almost the same extent. An example of such a type of the measurement device 30 may be Kinect (registered trademark). The taken image may be a monochrome image, but in the following, may be a color image and in this case data on luminance may be outputted together with color stimulus values such as R, G, and B values. The data on an image to be outputted from the measurement device 30 is referred to as second data.

The first data is associated with a corresponding one of pixels of the second data. In other words, the pixels of the second data are associated, one by one, with the measurement points to each give the first data, and the first data and the second data are outputted from the measurement device 30. Therefore, the measurement device 30 outputs the set of three dimensional coordinates (x, y, z) of the measurement point as the first data, and additionally three types of color stimulus values (CS1, CS2, CS3) of each measurement point and a luminance (LM) of each measurement point as the second data. Hereinafter, the color stimulus values (CS1, CS2, CS3) and the luminance (LM) are collectively referred to as color information.

As described above, the measurement device 30 outputs the first data regarding the three dimensional shape of the desired object 20 and the second data regarding the color information of the desired object 20. The second data is associated with the three dimensional coordinates of the measurement points, and is used as data on a color image. In short, selecting one of pixels of the color image is equivalent to selecting one of the measurement points, and as a result, the first data corresponding to the selected pixel is extracted. Note that, the measurement device 30 may be configured to output only the first data.

In the present embodiment, the desired object 20 is a room, and for example, the desired object 20 may include a floor surface 31, a ceiling surface 32, and wall surfaces 33, as shown in FIG. 2. Therefore, the measurement device 30 outputs the first data and the second data regarding an inside space of the desired object 20. Hereinafter, when there is no need to distinguish the floor surface 31, the ceiling surface 32, and the wall surfaces 33 from each other, they are each merely referred to as a surface 3. In some cases, the ceiling surface 32 may not be parallel to the floor surface 31, but in this case, the ceiling surface 32 is supposed parallel to the floor surface 31.

The measurement device 30 has a relatively wide field of view (measurement range), but in some cases it is difficult to measure a whole of an inside space of the desired object 20 at one time. Depending on the purpose of measurement, it is sufficient to measure focused part of the inside space of the desired object 20 only, and in this case it may be possible to achieve the purpose by one time measurement.

The measurement can be performed multiple times for different locations and directions of the measurement device 30. The functions of the measurement device 30 are not described in detail, but the measurement device 30 has a function to connect multiple sets of the first data and the second data obtained by multiple time measurement based on attributes of the measurement points without causing overlaps. Therefore, when the multiple time measurement is conducted with appropriate locations of the measurement device 30, the multiple sets of the first data and the second data outputted from the measurement device 30 can contain information on all of the surfaces of the desired object 20.

The dimension measurement device 10 extracts information on the surface 3 constituting the desired object 20 based on data obtained from the measurement device 30. The dimension measurement device 10 may have a function to extract various types of information on the desired object 20 based on the information on the extracted surface.

The dimension measurement device 10 may be realized by a computer to operate in accordance with a program. In other words, by using a program allowing a computer to function as the dimension measurement device 10, the dimension measurement device 10 can be realized.

The computer may include a keyboard and a pointing device as an input device 40, and also includes a display device as an output device 41. Note that, the computer may be a tablet terminal or a smartphone in which a touch panel serving as the input device 40 is integrated with a display device serving as the output device 41. The dimension measurement device 10 includes an inputter 15 serving as an interface unit for obtaining information inputted into the input device 40, and also includes an outputter 17 serving as an interface unit for outputting information to the output device 41. The interface unit may be defined as a circuit for receiving and/or sending data.

Note that, the computer may not be general-purpose, but may be dedicated. Further, the computer may be a system constituted by one or more computers. For example, the computer may be a computer server, or a cloud computing system, and in this case, a user may be allowed to use the following functions by use of a terminal device capable of communicating with the computer server or the cloud computing system.

As shown in FIG. 1, the dimension measurement device 10 includes an obtainer 11 configured to obtain the first data and the second data from the measurement device 30. It is preferable that the obtainer 11 obtain the second data, but it is sufficient that the obtainer 11 obtain the first data only.

The dimension measurement device 10 includes a surface extractor 12 configured to extract the surface 3 constituting the desired object 20 based on the first data regarding the desired object 20 obtained by the obtainer 11. In the present embodiment, the desired object 20 is supposed to be a room, and therefore part of the surface 3 may be in back of, and concealed by, furniture, equipment, or the like, when viewed from the measurement device 30. And, the three dimensional measurement of concealed part is difficult. In view of this, the surface extractor 12 has a function to estimate an entire shape of the surface 3 based on information obtained from part of the surface 3 and additional information on the surface 3 and then estimate an entire shape of the desired object 20 based on the entire shape of the surface 3.

To use information on part of the surface 3, the surface extractor 12 has a function to display a color image on the display device serving as the output device 41 based on the second data, and a function to recognize a region of the color image designated by the input device 40 as a region where the surface 3 is present. A user can see the color image displayed on the output device 41 and identifies the type of the surface 3 based on the color information on the surface 3. Therefore, it can be easy for the user to visually identify the type of the surface 3.

In a state where the color image representing the whole of the desired object 20 is displayed on a screen of the output device 41, the surface extractor 12 allows a user to designate a desired region in the color image with the input device 40. When the user designates the surface 3, it is preferable that a selection frame in an appropriate shape be displayed on the screen of the output device 41 and the selection frame be moved to be included in an area of the surface 3 to be designated. The selection frame may have any of various shapes, but may preferably have a simple shape such as a rectangular or square shape, a triangle shape, and an ellipse shape.

As described above, the user sets the selection frame inside the area of the surface 3 by use of the input device 40, and as a result, with regard to the image displayed on the output device 41, an extraction area of the measurement points belonging to the surface 3 is inputted as the selection frame through an interactive process. In short, the user sees the image displayed on the screen of the output device 41 and operates the input device 40 to set the selection frame for each of the multiple surfaces 3 (the floor surface 31, the ceiling surface 32, and the individual wall surfaces 33) surrounding the room.

The surface extractor 12 extracts the first data for each of three measurement points whose locations are preliminarily determined relative to the outline of the selection frame inside the area of the selection frame (the three measurement points present in predetermined positions relative to the selection frame). The first data is the set of three dimensional coordinates. Therefore, when sets of coordinates of three points included in the same plane are obtained, an expression of a plane including the three measurement points set by the selection frame can be determined uniquely. In other words, a mathematical formula representing a plane including the three measurement points can be calculated. Generally, the expression of the plane can be expressed as $ax+by+cz=d$, by use of the set of coordinates (x, y, z) serving as the first data. Note that, a, b, c, and d are constant values.

The additional information on the surface 3 may include information on the shape of the surface 3 and information on arrangement of different surfaces 3, for example. The information on the shape of the surface 3 may include information that "the room of the building is surrounded by a group of flat surfaces". When the surface 3 is not a flat surface, such a surface can be considered as a relatively simple curved surface (e.g., a curved surface with a U shaped section or a semispherical surface). However, in the present embodiment, the surface 3 is supposed to be a flat surface. The information on arrangement of different surfaces 3 may include information that "a boundary between adjacent surfaces 3 is contained in an intersection of the adjacent surfaces 3". Additionally, when the surface 3 is a flat surface, the information that "one end of the boundary is a vertex shared by three surfaces 3" can be used.

The surface extractor 12 may automatically extract the surface 3 of the desired object 20 based on the first data or the second data outputted from the measurement device 30 in combination with the additional information as described above. Accordingly, the surface extractor 12 determines the surface 3, and generates a mathematical formula representing the determined surface 3 based on the first data of the multiple (three or more) measurement points belonging to the determined surface 3.

The surface extractor 12 extracts a vertex shared by three surfaces 3 based on the generated mathematical formulae, for two or more sets of three surfaces 3. The surface extractor 12 extracts a straight line interconnecting the extracted vertexes as the boundary of adjacent two of the surfaces 3. In other words, the surface extractor 12 creates data expressing a schematic shape of the desired object 20 based on a combination of vertexes and boundaries, and stores a relationship between the coordinates of each of the vertexes and links between the vertexes.

When the data stored in the surface extractor 12 is provided to a program for displaying a drawing on the screen of the output device 41, a line drawing (wireframe model) in which the surfaces 3 included in the desired object 20 are divided by the boundaries is depicted on the screen of the display device serving as the output device 41.

In the operation example described above, the surface extractor 12 designates the surface 3 which the user tries to extract, through the interactive process, but can automatically determine at least one of surfaces 3 in view of additional restrictions. For example, when it is already known that the floor surface 31 and the ceiling surface 32 are parallel to each other, and when the floor surface 31 and the ceiling surface 32 are simple flat surfaces, the floor surface 31 and the ceiling surface 32 can be recognized automatically. In another example, when it is already known that with regard to the surface 3 the area of the concealed part is smaller than the area of the exposed part, the position of the surface 3 can be estimated based on the frequency distribution. However, the technique of automatically extracting the surface 3 may not be important, and therefore is not described in detail.

In any case, once the mathematical formula representing the surface 3 is calculated, the surface 3 can be distinguished from other objects. For example, a distance from the measurement device 30 can be used as auxiliary information, and thereby the wall surface 33 can be separated from furniture or the like.

Figure 3:
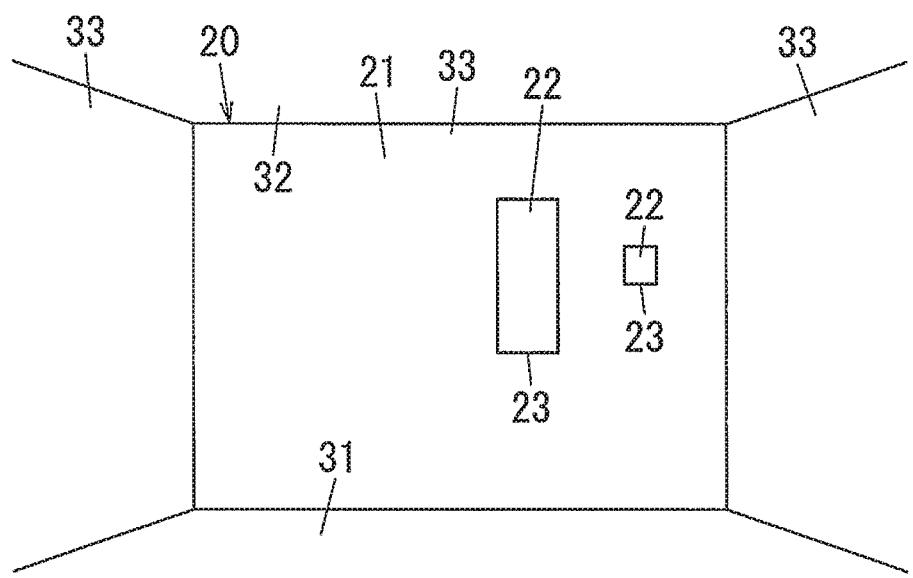
FIG. 3 is a perspective view of an example of a space where the dimension measurement device of Embodiment 1 is used.

As shown in FIG. 3, in many cases, one or more various objects 22 selected from outlets, wall switches, windows, air conditioners, lighting fixtures, range hoods, underfloor storage are attached to one or more of the floor surface 31, the ceiling surface 32, and the wall surfaces 33 surrounding the room. In a case of attaching new cloth or the like, dimensions of the cloth is determined so as not to be in contact with these objects 22. Alternatively, in reform, to allocate floor materials, it is required to determine the positions of these objects 22 precisely.

Hereinafter, a technique of determining the position of the object 22 attached to a focused surface 21 which is defined as one of the two or more surfaces 3 extracted by the surface extractor 12. The focused surface 21 may be selected from all the surfaces extracted by the surface extractor 12. The surface extractor 12 may be configured to select one of the surfaces as the focused surface 21 automatically in a predetermined order of the surfaces. Or, the input device 40 may be configured to allow a user to designate one of the surfaces as the focused surface 21.

In the following explanation, the focused surface 21 is one of the surfaces 3 which is designated by use of the input device 40. The focused surface 21 fulfills the condition where the boundaries 211 and 212 with adjacent surfaces 3 are extracted so as to form a perimeter of the focused surface 21. There is no intention to limit the scope of the embodiment, but in many cases, the outer shape of the focused surface 21 is rectangular or square, and therefore the following explanation is made to a case where the focused surface 21 is rectangular. In this regard, the focused surface 21 is a rectangular surface enclosed by the two boundaries 211 along the upward and downward direction and the two boundaries 212 along the left and right direction. The technique described below can be applicable to a case where the focused surface 21 has another shape such as a pentagonal shape and a trapezoidal shape.

Figure 4A:
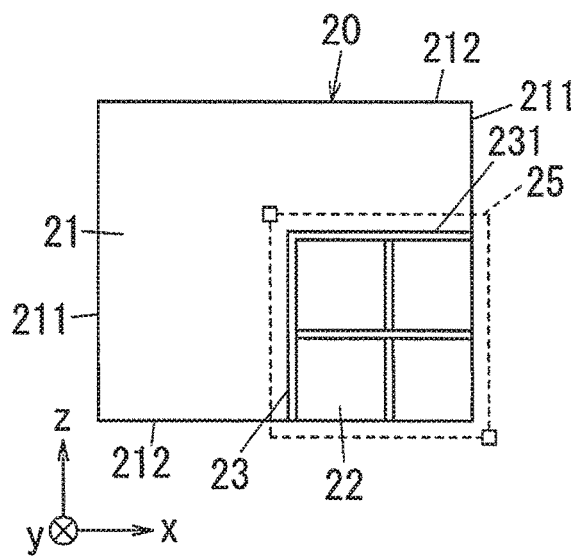
FIGS. 4A to 4D are diagrams illustrating an example of the operation of the dimension measurement device of Embodiment 1.

When the surface extractor 12 determines the focused surface 21, a region extractor 13 included in the dimension measurement device 10 tries to extract a candidate region 23 corresponding to the object 22 attached to the focused surface 21. As shown in FIG. 4A, the region extractor 13 of the present embodiment is configured to receive a designation frame 25 for designating an area where the candidate region 23 exists, from the input device 40. When a user operates the input device 40 to designate a rough area of the candidate region 23 by the designation frame 25, the region extractor 13 extracts positions of constituents of the edge 231 surrounding the candidate region 23 within the designation frame 25. For example, the position of the edge 231 may refer to positions of constituents of the edge 231 which are regarded as positions of the measurement points corresponding to the edge 231 rather than intermediate positions between the measurement points.

To extract the position of the edge 231 surrounding the candidate region 23, the focused surface 21 is distinguished from the candidate region 23 based on a difference between attributes of the focused surface 21 and the candidate region 23. The attribute used for distinction between the focused surface 21 and the candidate region 23 may include at least one of the color information and the set of coordinates.

In a case of distinguishing the focused surface 21 from the candidate region 23 based on the color information, a range of colors is set for the color information of the focused surface 21 and the set of coordinates of the measurement point associated with the color information which indicates a color not falling within this range of colors is regarded as a set of coordinates of a constituent of the candidate region 23. The range of the color information is determined by a region on a chromaticity diagram or a distance (difference) between chromaticities calculated from the color information.

In another case of distinguishing the focused surface 21 from the candidate region 23 based on the coordinates, a geometrical distance from the focused surface 21 is used. When the geometrical distances of the multiple measurement points from the focused surface 21 exceed a reference value and the measurement points spaced away from the focused surface 21 by a distance greater than the reference value form a continuous region within a plane parallel to the focused surface 21, the continuous region is regarded as candidate region 23.

The focused surface 21 is distinguished from the candidate region 23 in the aforementioned manner. As a result, as shown in FIG. 4B, a region which is inside the designation frame 25 and is regarded as the candidate region 23 is excluded from the illustration on the screen of the output device 41 (e.g., such a region is outlined). In summary, a pixel with the set of coordinates corresponding to the candidate region 23 is excluded from the screen of the output device 41.

Next, the position of the edge 231 of the candidate region 23 is determined. In this process, the region extractor 13 performs scanning in two directions (the upward and downward direction and the left and right direction in FIG. 4C) along the boundaries 211 and 212 of the focused surface 21 from a start point. The start point is positioned inside a region surrounded by the designation frame 25 in a flat surface representing the focused surface 21, and is inside the candidate region 23 certainly. In many cases, the designation frame 25 is set so that a distance between center positions of the designation frame 25 and the candidate region 23 is not so long. When a position of a geometric center or a center of gravity of the designation frame 25 is selected as the position of the start point, the position of the start point is considered to be included in the candidate region 23. Alternatively, the position of the start point may be a position of a geometric center or a center of gravity of a region of pixels excluded from the focused surface 21 in the designation frame 25.

Figure 4C:
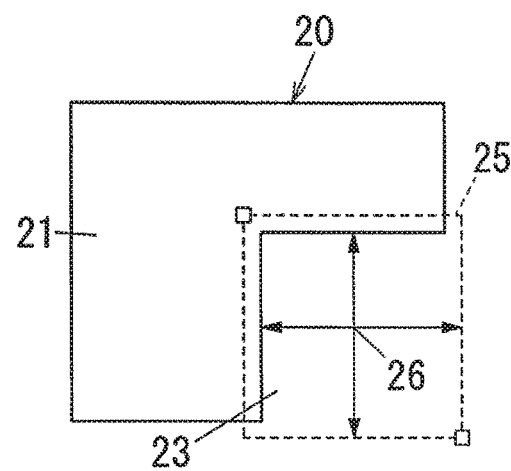
Figure 4B:
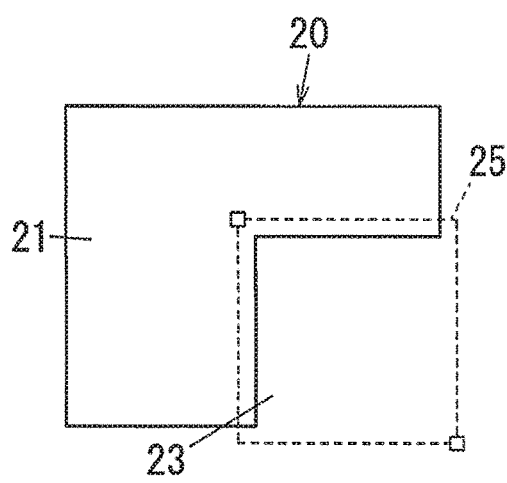
Figure 4D:
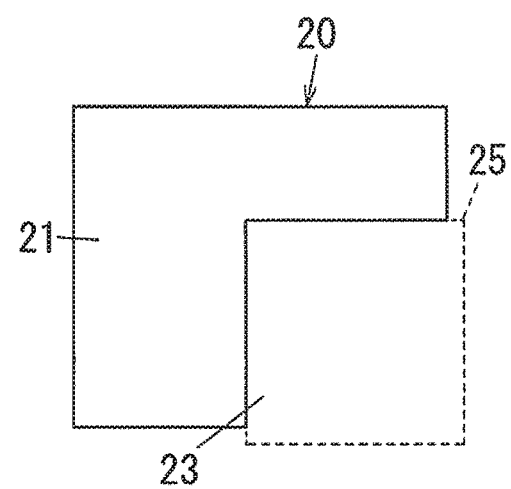

For example, in an example shown in FIG. 4C, the position of the geometric center of the designation frame 25 is used as a position of a start point 26. In this example, in the drawing, the focused surface 21 is surrounded by the boundaries 211 in the upward and downward direction and the boundaries 211 in the left and right direction, and therefore the region extractor 13 performs scanning from the start point 26 in both the upward and downward directions and in both the left and right directions as shown in arrowed straight lines of the drawing, and thereby determines the edge 231 of the candidate region 23. When each side of the edge 231 of the candidate region 23 is parallel to the boundary 211 or 212 of the focused surface 21, the sets of coordinates of the edge 231 determined by scanning from the start point 26 in the upward and downward direction and the left and right direction can be regarded as the position of the edge of the candidate region 23, as shown in FIG. 4D.

In order to simplify the explanation, the focused surface 21 is supposed to be in an xz-plane. Additionally, it is supposed that the edge 231 of the candidate region 23 has a rectangular shape and each side thereof is parallel to the x-direction or the z-direction. In this case, the edge 231 of the candidate region 23 is constituted by four straight lines z=x1, z=x2, x=z1, x=z2 (x1, x2, z1, and z2 are determined by the candidate region 23). Therefore, the edge 231 of the candidate region 23 can be determined based on sets of coordinates of intersections of the edge 231 and lines of scanning in the x-direction and the z-direction from the start point 26 determined within the candidate region 23.

When there is no assurance that the edge 231 of the candidate region 23 has sides parallel to either the boundaries 211 or 212 of the focused surface 21, the region extractor 13 may determine the position of the edge 231 of the candidate region 23 by tracing the set of coordinates corresponding to the edge 231 from a point on the edge 231 determined by the scanning from the start point 26. The set of coordinates extracted as the position of the edge 231 of the candidate region 23 may not exist on the straight line, and therefore the edge 231 surrounding the candidate region 23 may be determined by applying formulae representing straight lines as with the case of the focused surface 21.

In a case where part of the candidate region 23 is not surrounded by the focused surface 21 as with the example shown in FIG. 4A to 4D (e.g., the object 22 is present at the corner at which the multiple surfaces 3 meet), the perimeter of the edge 231 of the candidate region 23 cannot be determined with regard to the single focused surface 21. In such a case, as to the edge 231 which cannot be determined by scanning, the boundaries 211 and 212 of the focused surface 21 are used as sides of the edge 231 of the candidate region 23.

The candidate region 23 may has a rectangular shape as with the above, but may have a simple geometric shape such as a circular shape, an ellipse shape, and a triangular shape. The user already knows the shape the object 22. When information on a type including the shape of the object 22 is given to the region extractor 13, a shape matched with the edge 231 can be selected. When the shape to be matched with the edge 231 is already known, the region extractor 13 may trace the sets of coordinates of the edge 231, and may adjust the size of the shape to be matched, so as to minimize deviations from the traced sets of coordinates.

When the edge 231 surrounding the candidate region 23 is determined in the aforementioned manner, the region extractor 13 stores information defining the edge 231. When the edge 231 is rectangular, it is sufficient to store the sets of coordinates of four vertexes. When the edge 231 is circular, it is sufficient to store the diameter (or radius) of the circle and the set of coordinates of the center of the circle. Note that, when the edge 231 is circular, the region extractor 13 may set a rectangle which has sides parallel to either the boundary 211 or 212 of the focused surface 21 and is circumscribed around a circle, and store positions of four vertexes of this rectangle (or two vertexes on a diagonal line). In a case of an ellipse shape and a triangular shape, as with the above, the region extractor 13 may store information uniquely determining the shape of the edge 231.

The region extractor 13 displays a window 42 with a content shown in FIG. 5 on the screen of the output device 41 in order to allow a user to designate attributes for cutting out the candidate region 23 from the focused surface 21 and the type of the candidate region 23 or the shape of the candidate region 23. In a state where this window 42 is displayed, the region extractor 13 receives input information from the input device 40.

In the example shown in FIG. 5, the type of the object 22 corresponding to the candidate region 23 can be selected from "opening", "wiring fixture", and "other". As to "other", one of "rectangle" and "circle" can be selected with radio buttons. Further, the reference value ("cut-out width") can be set in a unit of mm, and in the illustrated example the reference value is set to "5 mm". Therefore, the measurement point away from the focused surface 21 by a distance of 5 mm is determined to be the measurement point of the candidate region 23.

Figure 6:
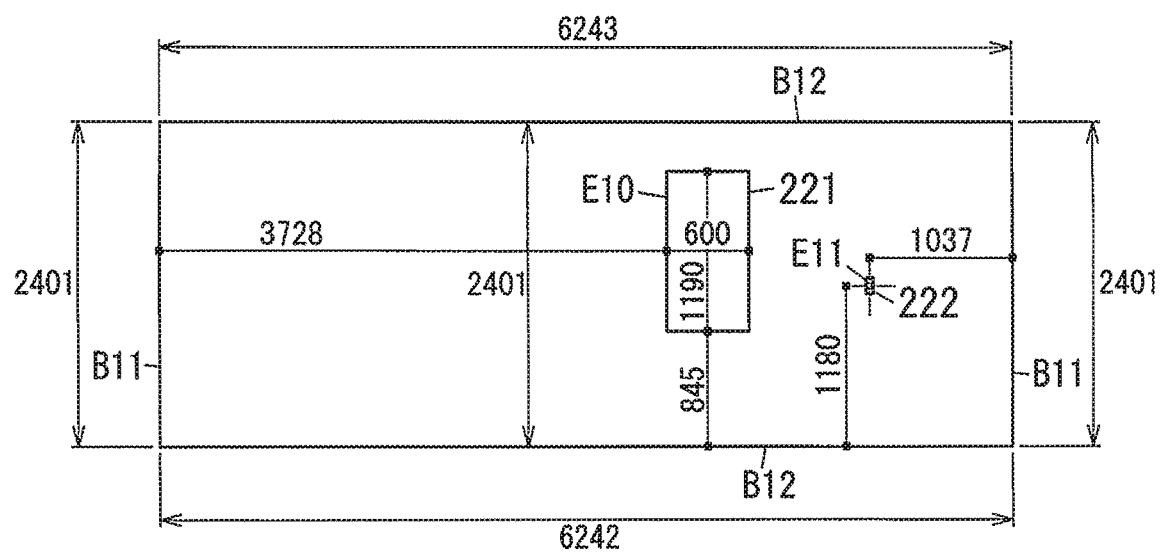
FIG. 6 is a diagram illustrating an example of a dimensional drawing created by the dimension measurement device of Embodiment 1.

The measurement device 30 measures a distance, and therefore actual dimensions of the desired object 20 can be obtained from the three dimensional coordinates. Therefore, when the position of the edge 231 surrounding the candidate region 23 is determined in the aforementioned manner, a dimension generator 14 calculates dimensions from the boundaries 211 and 212 (the sets of coordinates of the measurement point constituting the boundaries 211 and 212) of the focused surface 21 to the edge 231 (the sets of coordinates of the measurement points constituting the edge 231) of the candidate region 23, dimensions of the candidate region 23, or the like, based on the sets of coordinates measured by the measurement device 30. In short, the dimension generator 14 generates dimensional data necessary for creating a dimensional drawing (allocation drawing). The dimensional drawing is a drawing indicative of dimensions in relation to the desired object 20. In the case of the present embodiment, the dimensional drawing is a drawing which illustrates, as shown in FIG. 6, dimensions of the focused surface 21 of the desired object 20, dimensions of the object 22, and a relationship between the focused surface 21 and the object 22.

Note that, manners for treating dimensions actually measured and dimensions to be described in the dimensional drawing are different between a case where the object 22 corresponding to the candidate region 23 is a window and another case where the object 22 is a wiring fixture. For example, the dimension generator 14 modifies a position and one or more dimensions of the object 22 relative to the position of the edge by use of information on the type of the object 22. FIG. 6 shows an example of a dimensional drawing made based on the dimensional data generated by the dimension generator 14. With regard to a window 221 classified into an opening, the distances from the boundaries B11 and B12 to the edge E10 and additionally the dimensions of the window 221 are described. With regard to a wiring fixture 222, only the distances from the boundaries B11 and B12 to the edge E11 (corresponding to the center position of the wiring fixture 222 in FIG. 6) are described. Note that, unit of the length in FIG. 6 is [mm].

Figure 7:
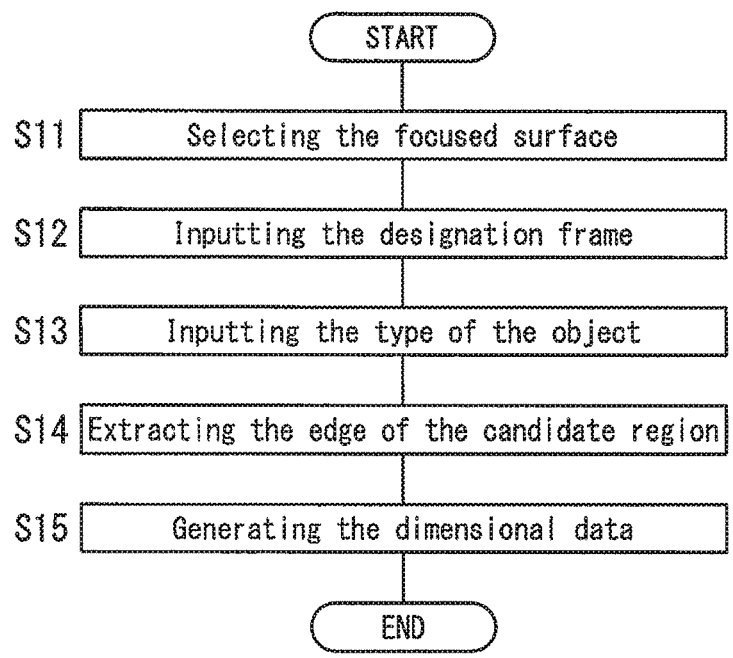
FIG. 7 is a flowchart of an operation of the dimension measurement device of Embodiment 1.

The process of determining the positions of the edge of the candidate region 23 of the present embodiment includes steps which are collectively shown in FIG. 7. The process shown in FIG. 7 starts after the three dimensional coordinates are obtained from the measurement device 30. In the present embodiment, after the surface extractor 12 waits to receive, from the input device 40, the input of selecting the focused surface 21 (S11), the region extractor 13 waits to receive, from the input device 40, the input for roughly designating the area of the candidate region 23 based on the designation frame 25 (S12). Further, the region extractor 13 waits to receive, from the input device 40, the input for designating the type of the object 22 (S13). The step S12 and the step S13 may be interchanged. When the inputs relating to these pieces of information are inputted, the region extractor 13 extracts the positions of the edge of the candidate region 23 (S14) and the dimension generator 14 generates the dimensional data for drawing the dimensional drawing (S15).

The dimension measurement device 10 of the present embodiment executes a dimension measurement method described below. The dimension measurement method includes obtaining, from the measurement device 30 for performing three dimensional measurement of the desired object 20, a set of coordinates in three dimensions of the desired object 20, by the computer (the obtainer 11). Further, the dimension measurement method includes determining the focused surface 21 constituting the desired object 20 based on the set of coordinates and extracting a position of a boundary of the focused surface 21, by the computer (the surface extractor 12). Further, the dimension measurement method includes extracting, in relation to a candidate region 23 corresponding to the object 22 being a specific object attached to the focused surface 21, a position of an edge surrounding the candidate region 23, by the computer (the region extractor 13). Further, the dimension measurement method includes generating dimensional data necessary for creating a dimensional drawing of the desired object 20 from the position of the boundary and the position of the edge, by the computer (the dimension generator 14).

Additionally, the dimension measurement method includes receiving input designating a type of the object 22, by the computer (the inputter 15). Further, the dimension measurement method includes modifying a position and one or more dimensions of the object 22 relative to the position of the edge by use of information on a designated type of the object 22, by the computer (the dimension generator 14).

Additionally, the dimension measurement method includes receiving input designating an area in which the candidate region 23 exists, by the computer (the inputter 15). Further, the dimension measurement method includes extracting the candidate region 23 from a designated area, by the computer (the region extractor 13).

Additionally, the dimension measurement method includes obtaining, when the measurement device 30 has a function to output color information for the set of coordinates, the set of coordinates together with the color information, by the computer (the obtainer 11). Further, the dimension measurement method includes regarding, as a set of coordinates of the candidate region 23, the set of coordinates associated with the color information which indicates a color included in a predetermined range of colors, by the computer (the region extractor 13).

The present embodiment does not refer to a process subsequent to outputting of the dimensional data. For example, in the process, the dimensional drawing may be displayed on the screen of the display device serving as the output device 41. Or, the dimensional drawing may be printed with a plotter of a printer serving as the output device 41.

As shown in FIG. 1, the dimension measurement device 10 of the present embodiment includes the obtainer 11, the surface extractor 12, the region extractor 13, and the dimension generator 14. The obtainer 11 is configured to obtain, from the measurement device 30 for performing three dimensional measurement of the desired object 20, the set of coordinates in three dimensions of the desired object 20. The surface extractor 12 is configured to determine the focused surface 21 (shown in FIG. 3) constituting the desired object 20 based on the set of coordinates, and extract a position of a boundary of the focused surface 21. The region extractor 13 is configured to extract, in relation to the candidate region 23 (shown in FIG. 3) corresponding to the object 22 (shown in FIG. 2) being a specific object attached to the focused surface 21, the position of the edge surrounding the candidate region 23. The dimension generator 14 is configured to generate dimensional data necessary for creating the dimensional drawing of the desired object 20 from the position of the boundary and the position of the edge.

In a preferable aspect, the dimension measurement device 10 further includes an inputter 15. The inputter 15 has a function to receive input designating a type of the object 22 from an input device 40. In this aspect, the dimension generator 14 may be configured to modify a position and one or more dimensions of the object 22 relative to the position of the edge by use of information on the type of the object 22.

In a preferable aspect, the inputter 15 may have a function to receive input designating an area in which the candidate region 23 exists. In this aspect, the region extractor 13 may be configured to extract the candidate region 23 from the area designated by the inputter 15.

In a preferable aspect, the obtainer 11 may have a function to, when the measurement device 30 has a function to output color information for the set of coordinates, obtain the set of coordinates together with the color information. In this aspect, the region extractor 13 may have a function to regard, as a set of coordinates of the candidate region 23, the set of coordinates associated with the color information which indicates a color included in a predetermined range of colors.

The dimension measurement system of the present embodiment includes the dimension measurement device 10 and the measurement device 30. Further, the dimension measurement system preferably may include the input device 40. These points can be applicable to Embodiments 2 and 3 described below.

The dimension measurement device 10 of the present embodiment is configured by hardware components which mainly include a computer for operating in accordance with a program. In other words, the program allows the computer to function as the dimension measurement device 10 described above. Such a program may be stored in a ROM (Read Only Memory) of a dedicated computer, be provided to a general-purpose computer through a telecommunications circuit such as the Internet or a computer-readable recording medium. This point can be applicable to Embodiments 2 and 3 described below.

Embodiment 2

Figure 8:
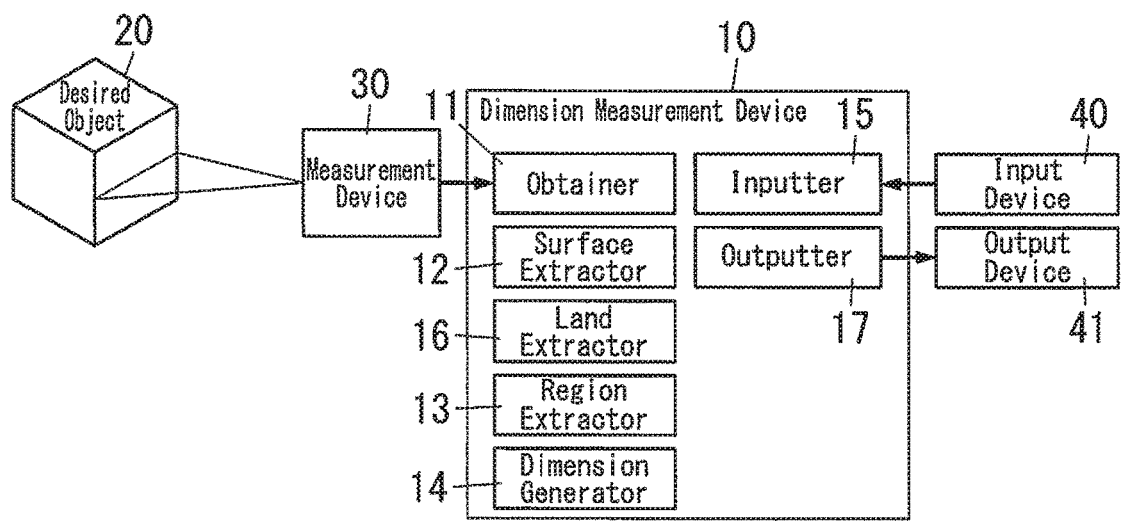
FIG. 8 is a block diagram of a dimension measurement device of Embodiment 2.
Figure 9A:
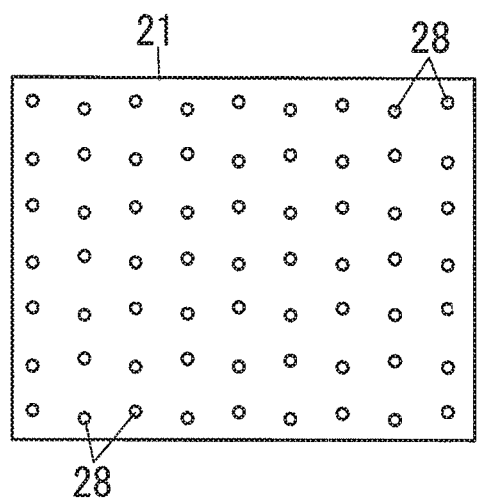
FIGS. 9A to 9C are diagrams illustrating an example of an operation of the dimension measurement device of Embodiment 2.
Figure 9B:
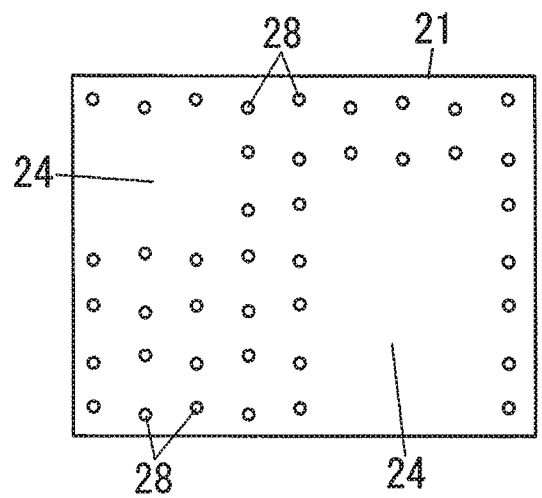

In Embodiment 1, the region extractor 13 allows input of the designation frame 25 for designating a rough area of the candidate region 23 through the input device 40. In contrast, the present embodiment is configured to automatically extract, as a land 24, a region which has a potential to be the candidate region 23, as shown in FIG. 9B. In other words, as shown in FIG. 8, the dimension measurement device 10 includes a land extractor 16 configured to extract one or more lands 24 automatically.

Figure 10A:
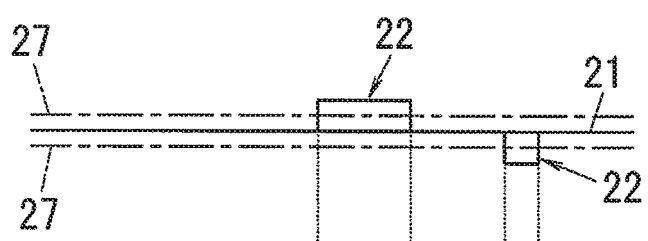
FIGS. 10A and 10B are plan views of an example of a space where the dimension measurement device of Embodiment 2 is used.
Figure 10B:
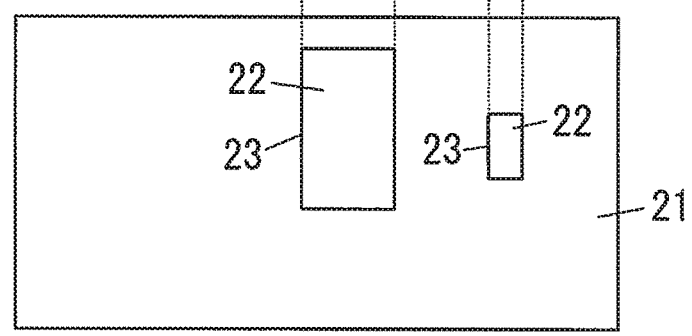

The land extractor 16 determines that a continuous region formed by the measurement points 28 away from the focused surface 21 by a distance exceeding the reference value is a land 24. As with the technique of distinguishing the focused surface 21 from the candidate region 23 inside the designation frame 25 in Embodiment 1, in the present embodiment, with regard to the measurement points 28 inside the area of the focused surface 21 obtained as shown in FIG. 9A, the land 24 is extracted based on the distance between the focused surface 21 and the measurement point 28. In more detail, as shown in FIG. 10A and FIG. 10B, the surface of the object 22 attached to the focused surface 21 is considered to be closer to the inside of the room or the outside of the room than the focused surface 21 is. Therefore, when the measurement points 28 away from the focused surface 21 by a distance exceeding the reference value 27 form a continuous region, the land extractor 16 extracts such a continuous region as the land 24 which has a potential to be the candidate region 23.

Figure 9C:
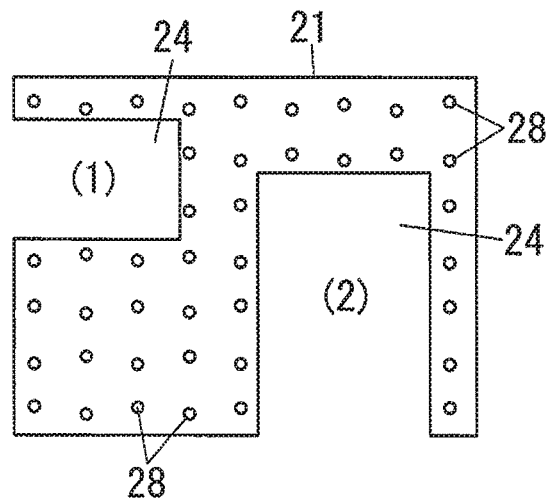

To facilitate the process at the region extractor 13, the land extractor 16 preferably labels extracted lands 24 as shown in FIG. 9C (in the illustration, labels (1) and (2) are attached). In exclusion of useless lands 24, when the lands 24 are attached with labels, it is possible to collectively exclude the measurement points belonging to the useless lands 24 from the candidate regions 23 by merely designating the corresponding labels. For example, in a case of excluding the measurement points belonging to the land 24 attached with the label (1) from the candidate region 23, designating the label (1) leads to collective exclusion of the measurement points belonging to the land 24 from the candidate region 23. When only the label (1) is designated, the land 24 attached with the label (2) is left as the candidate region 23. In this case, the measurement points 28 of the land 24 attached with the label (1) are returned to their original states.

For example, when a wall clock and a door are extracted as the lands 24, the wall clock is detachable and therefore the land 24 corresponding to the wall clock need not be treated as the candidate region 23. In such a case, the region extractor 13 may receive, from the input device 40, input indicative of the lands 24 to be left as the candidate regions 23, and therefore the land 24 corresponding to the door can be left as the candidate region 23. Or, the region extractor 13 may receive, from the input device 40, input indicative of the desired lands 24 to be excluded, and therefore the land 24 corresponding to the wall clock can be excluded from the candidate region 23.

The region extractor 13 is configured to display the focused surface 21 and one or more lands 24 on the output device 41, and to allow a user to designate a land 24 to be included in the candidate region 23 and a land 24 to be excluded from the candidate region 23 through an interactive process with the input device 40. Therefore, the inputter 15 receives, from the input device 40, input designating the land 24 to be adopted as the candidate region 23, and thereby the land 24 treated as the candidate region 23 is determined. Note that, the input device 40 may be configured to designate the land 24 to be excluded from the candidate region 23 and the region extractor 13 may be configured to adopt the land 24 which is not excluded. This configuration is substantially the same as the above configuration.

Figure 11:
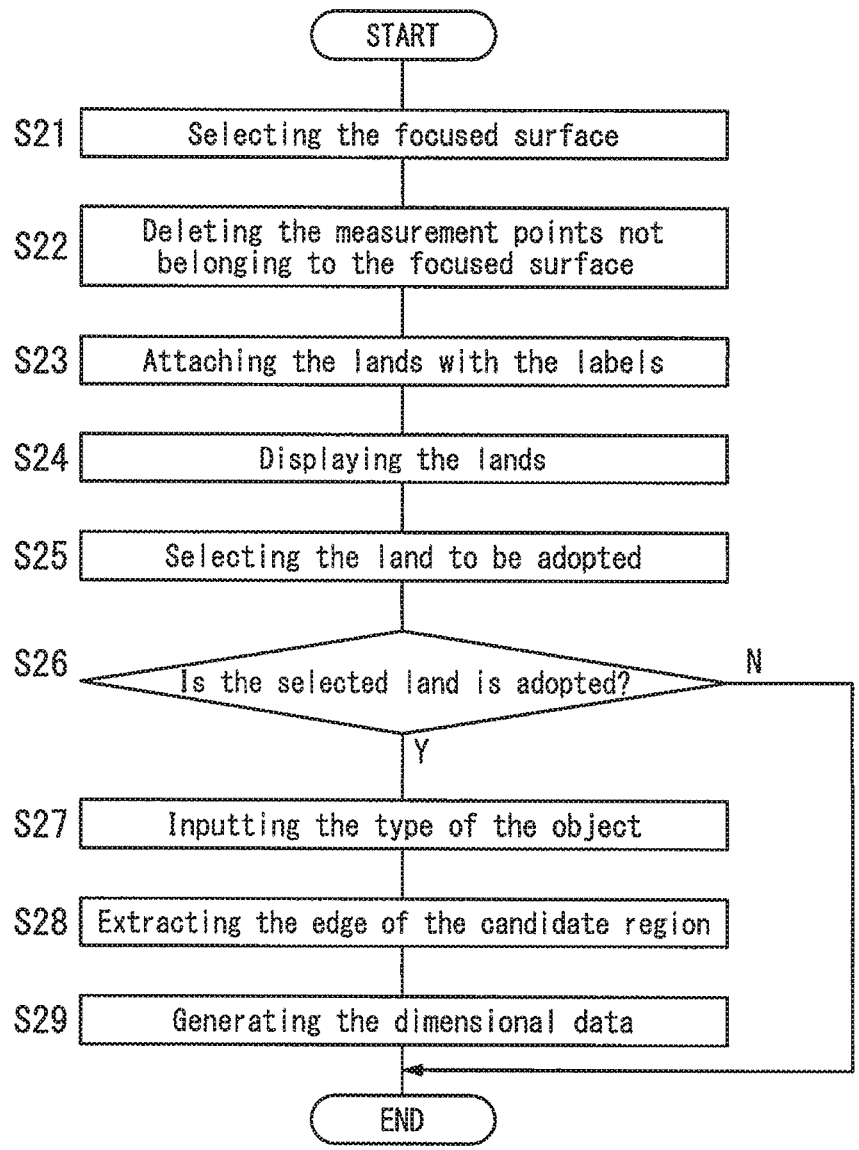
FIG. 11 is a flowchart of the operation of the dimension measurement device of Embodiment 2.

Other components and operations of the present embodiment are substantially the same as those of Embodiment 1. FIG. 11 briefly shows the operations of the present embodiment. The surface extractor 12 receives input of selecting the focused surface 21 from the input device 40 (S21), and thereafter the land extractor 16 extracts the measurement points away from the focused surface 21 by a distance exceeding the reference value and excludes them (S22). Further, the land extractor 16 attaches labels to the respective lands 24 each defined as a set of excluded measurement points (S23).

When the lands 24 are attached with the labels, the region extractor 13 displays the lands 24 on the screen of the output device 41 (S24) and waits to receive instructions from the input device 40 (S25). When the instructions from the input device 40 show that there is one or more lands 24 adopted as the candidate regions 23 (S26: Y), the region extractor 13 waits to receive input of designating the type of the object 22 from the input device 40 for each land 24 (S27). For example, when there are two or more lands 24 to be the candidate regions 23, the type of the object 22 is designated for each of the two or more lands 24. The step S27 can be performed prior to the step S25. After the step S27, the region extractor 13 extracts the position of the edge of the candidate region 23 (S28), and the dimension generator 14 generates the dimensional data for describing the dimensional drawing in view of the type of the object 22 (S29).

When the input device 40 does not give any instructions indicative of the land 24 to be adopted as the candidate region 23 (S26: N), the region extractor 13 ends the processing. In brief, when the lands 24 extracted by the land extractor 16 do not include any land 24 corresponding to the object 22, the processing is ended. Note that, in the operation example of FIG. 11, it is supposed that, when there are two or more lands 24 to be the two or more candidate regions 23, the two or more candidate regions 23 are designated collectively.

The dimension measurement device of the present embodiment executes a dimension measurement method described below. The dimension measurement method further includes extracting, as a land 24, a region which has the set of coordinates away from the focused surface 21 by a distance exceeding the reference value and is attached to the focused surface 21, so as to give one or more lands 24, by the computer (the land extractor 16). Additionally, the dimension measurement method includes receiving input which is obtained through an interactive process to designate a land 24 which is one of the one or more lands 24 and corresponds to the object 22, by the computer (the inputter 15). Additionally, the dimension measurement method includes selecting a designated land 24 as the candidate region 23, by the computer (the region extractor 13).

As shown in FIG. 8, the dimension measurement device 10 of the present embodiment may further include the land extractor 16 configured to extract, as a land 24, a region which has the set of coordinates away from the focused surface 21 by a distance exceeding the reference value and is attached to the focused surface 21, so as to give one or more lands 24.

In this case, the inputter 15 may preferably have a function to receive input which is obtained through an interactive process to designate a land 24 which is one of the one or more lands 24 and corresponds to the object 22. Further, the region extractor 13 may preferably be configured to select the land 24 designated by the inputter 15 as the candidate region 23.

Embodiment 3

In Embodiment 2, the land 24 is extracted when it satisfies only one condition where it is a continuous region of the measurement points away from the focused surface 21 by a distance exceeding the reference value. Therefore, the lands 24 may include a region not corresponding to the object 22, and this may require a user to select the land 24 corresponding to the object 22 with the input device 40. An increase in the number of lands 24 not corresponding to the object 22 may cause an increase in a burden on a user to manually select useless lands 24.

The present embodiment automatically determines whether the land 24 corresponds to the object 22, thereby decreasing a burden on a user to select the land 24 corresponding to the object 22 with the input device 40. Therefore, use of the technique of the present embodiment may lead to a decrease in the number of useless lands 24 is reduced, and therefore the work for selecting lands 24 not corresponding to objects 22 can be reduced. The configuration of the present embodiment is the same as the configuration of Embodiment 2 shown in FIG. 8, and therefore the present embodiment includes the land extractor 16.

To determine whether the land 24 corresponds to the object 22, the land extractor 16 preliminarily determines various types of reference shapes corresponding to objects 22. The reference shape corresponds to a template. The reference shape has a fixed geometric shape (e.g., a rectangular shape, a circular shape, an ellipse shape, and a triangle shape), but dimensions of the reference shape are adjustable to fit to a corresponding land 24.

The land extractor 16 evaluates the similarity between the reference shape and the land 24 each time changing the dimensions of the reference shape, and thereby extracts a reference shape which is the highest, in similarity with the land 24, of the reference shapes. In more detail, the dimensions of the reference shapes are adjusted so as to increase the similarity with the land 24, and then a reference shape which is the highest, in the similarity with the land 24, of the reference shapes with adjusted dimensions is extracted. When the extracted reference shape has the similarity with the land 24 which falls within a predetermined range of evaluation values, this reference shape is determined to fit to the land 24. The region extractor 13 uses the land 24 to which the reference shape fits, as the candidate region 23. Further, when the reference shape fits to the land 24, the outline of the reference shape is substitutable for the edge of the candidate region 23, and therefore the process of extracting the edge of the candidate region 23 is not necessary.

The land 24 fitting to the reference shape is considered to correspond to the object 22 at high probability, and therefore can be used as the candidate region 23. Depending on the shape of the desired object 20, the land 24 not corresponding to the object 22 may still remain in some cases. In view of this, as with Embodiment 2, the present embodiment also allows a user to manually operate the input device 40 to exclude the land 24 not corresponding to the object 22.

Other components and operations of the present embodiment are substantially the same as those of Embodiment 1 and Embodiment 2. FIG. 12 briefly shows the operations of the present embodiment. The surface extractor 12 receives input of selecting the focused surface 21 from the input device 40 (S31), and thereafter the land extractor 16 extracts the measurement points away from the focused surface 21 by a distance exceeding the reference value and excludes them (S32). Further, the land extractor 16 evaluates similarities between the various types of reference shapes and the lands 24, and extracts a land 24 which is one of the lands 24 and fits to any of the reference shapes (S34). Thereafter, the land extractor 16 attaches labels to the respective lands 24 each fitting to any of the reference shapes (S34).

Subsequent steps are the same as those of Embodiment 2. When the lands 24 are attached with the labels, the region extractor 13 displays the lands 24 on the screen of the output device 41 (535) and waits to receive instructions from the input device 40 (S36). When the instructions from the input device 40 show that there is one or more lands 24 adopted as the candidate regions 23 (S37: Y), the region extractor 13 waits to receive input of designating the type of the object 22 from the input device 40 for each land 24 (S38). In this regard, in the step S33, it is checked whether the reference shapes fits to the land 24, and therefore the outline of the reference shape is used as the edge of the candidate region 23. Thereafter the dimension generator 14 generates the dimensional data for describing the dimensional drawing in view of the type of the object 22 (S39).

When there is no land 24 to be adopted as the candidate region 23 (S26: N), the region extractor 13 ends the processing. In brief, when the lands 24 extracted by the land extractor 16 do not include any land 24 corresponding to the object 22, the processing is ended.

The dimension measurement device of the present embodiment executes a dimension measurement method described below. The dimension measurement method includes extracting, as the land 24, the region which has the set of coordinates away from the focused surface 21 by a distance exceeding the reference value and is attached to the focused surface 21, so as to give one or more lands 24, by the computer (the land extractor 16). Additionally, the dimension measurement method includes evaluating similarities between the one or more lands 24 and predetermined various types of reference shapes, by the computer (the land extractor 16). Additionally, the dimension measurement method includes selecting, as the candidate region 23, a land which is one of the one or more lands 24 and fits to any of the reference shapes, and to select, as the edge, an outline of a reference shape which is one of the reference shapes and fits to this land 24, by the computer (the region extractor 13).

Note that, in the examples relating to the above embodiments, the dimension measurement device 10 uses the second data. However, the second data is optional, and as apparent from the above technique, wireframe models can be generated from only the first data.

As shown in FIG. 8, the dimension measurement device 10 of the present embodiment includes the land extractor 16 configured to extract, as the land 24, the region which has the set of coordinates away from the focused surface 21 by a distance exceeding the reference value and is attached to the focused surface 21, so as to give one or more lands 24.

In a preferable aspect, the land extractor 16 may be configured to evaluate similarities between the one or more lands 24 and predetermined various types of reference shapes. In this aspect, the region extractor 13 is configured to select, as the candidate region 23, a land 24 which is one of the one or more lands 24 and fits to any of the reference shapes, and to select, as the edge, an outline of a reference shape which is one of the reference shapes and fits to this land 24.

(Aspects in Accordance with the Present Invention)

As apparent from Embodiments 1 to 3 described above, the dimension measurement device (10) of aspect 1 in accordance with the present invention includes: an obtainer (11) configured to obtain, from a measurement device (30) for performing three dimensional measurement of a desired object (20), a set of coordinates in three dimensions of the desired object (20); a surface extractor (12) configured to determine a focused surface (21) constituting the desired object (20) based on the set of coordinates, and extract a position of a boundary of the focused surface (21); a region extractor (13) configured to extract, in relation to a candidate region (23) corresponding to an object (22) being a specific object attached to the focused surface (21), a position of an edge surrounding the candidate region (23); and a dimension generator (14) configured to generate dimensional data necessary for creating a dimensional drawing of the desired object (20) from the position of the boundary and the position of the edge.

Accordingly, aspect 1 determines the focused surface (21) constituting the desired object (20) based on the set of three dimensional coordinates measured with regard to the desired object (20), and extracts, in relation to the candidate region (23) corresponding to the object (22) being a specific object attached to the focused surface (21), the position of the edge surrounding the candidate region (23). Further, aspect 1 generates dimensional data necessary for creating a dimensional drawing of the desired object (20) from the position of the boundary and the position of the edge. According to this configuration, aspect 1 can offer an advantage of being capable of creating a more accurate dimensional drawing of the desired object (20).

The dimension measurement device (10) of aspect 2 in accordance with the present invention would be realized in combination with aspect 1. The dimension measurement device (10) of aspect 2, further includes an inputter (15) having a function to receive input designating a type of the object (22) from an input device (40). The dimension generator (14) is configured to modify a position and one or more dimensions of the object (22) relative to the position of the edge by use of information on the type of the object (22).

The dimension measurement device (10) of aspect 3 in accordance with the present invention would be realized in combination with aspect 2. In the dimension measurement device (10) of aspect 3, the inputter (15) has a function to receive input designating an area in which the candidate region (23) exists. The region extractor (13) is configured to extract the candidate region (23) from the area designated by the inputter (15).

The dimension measurement device (10) of aspect 4 in accordance with the present invention would be realized in combination with aspect 2. The dimension measurement device (10) of aspect 4 further includes a land extractor (16) configured to extract, as a land (24), a region which has the set of coordinates away from the focused surface (21) by a distance exceeding a reference value and is attached to the focused surface (21), so as to give one or more lands (24). The inputter (15) has a function to receive input which is obtained through an interactive process to designate a land (24) which is one of the one or more lands (24) and corresponds to the object (22). The region extractor (13) is configured to select the land (24) designated by the inputter (15) as the candidate region (23).

The dimension measurement device (10) of aspect 5 in accordance with the present invention would be realized in combination with aspect 1 or 2. The dimension measurement device (10) of aspect 5 further includes a land extractor (16) configured to extract, as a land (24), a region which has the set of coordinates away from the focused surface (21) by a distance exceeding a reference value and is attached to the focused surface (21), so as to give one or more lands (24). The land extractor (16) is configured to evaluate similarities between the one or more lands (24) and predetermined various types of reference shapes. The region extractor (13) is configured to select, as the candidate region (23), a land (24) which is one of the one or more lands (24) and fits to any of the reference shapes, and to select, as the edge, an outline of a reference shape which is one of the reference shapes and fits to this land (24).

The dimension measurement device (10) of aspect 6 in accordance with the present invention would be realized in combination with any one of aspects 1 to 5. In the dimension measurement device (10) of aspect 6, the obtainer (11) has a function to, when the measurement device (30) has a function to output color information for the set of coordinates, obtain the set of coordinates together with the color information. The region extractor (13) has a function to regard, as a set of coordinates of the candidate region (23), the set of coordinates associated with the color information which indicates a color included in predetermined colors.

The dimension measurement method of aspect 7 in accordance with the present invention includes: obtaining, from a measurement device (30) for performing three dimensional measurement of a desired object (20), a set of coordinates in three dimensions of the desired object (20), by a computer; determining a focused surface (21) constituting the desired object (20) based on the set of coordinates and extracting a position of a boundary of the focused surface (21), by the computer; extracting, in relation to a candidate region (23) corresponding to an object (22) being a specific object attached to the focused surface (21), a position of an edge surrounding the candidate region (23), by the computer; and generating dimensional data necessary for creating a dimensional drawing of the desired object (20) from the position of the boundary and the position of the edge, by the computer.

In other words, the dimension measurement method of aspect 7 in accordance with the present invention includes: obtaining, from a measurement device (30) for performing three dimensional measurement of a desired object (20), a set of coordinates in three dimensions of the desired object (20), by an obtainer (11); determining a focused surface (21) constituting the desired object (20) based on the set of coordinates and extracting a position of a boundary of the focused surface (21), by a surface extractor (12); extracting, in relation to a candidate region (23) corresponding to an object (22) being a specific object attached to the focused surface (21), a position of an edge surrounding the candidate region (23), by a region extractor (13); and generating dimensional data necessary for creating a dimensional drawing of the desired object (20) from the position of the boundary and the position of the edge, by a dimension generator (14).

The dimension measurement method of aspect 8 in accordance with the present invention would be realized in combination with aspect 7. The dimension measurement method of aspect 8 further includes receiving input designating a type of the object (22), by the computer. Additionally, the dimension measurement method of aspect 8 includes modifying a position and one or more dimensions of the object (22) relative to the position of the edge by use of information on a designated type of the object (22), by the computer.

The dimension measurement method of aspect 9 in accordance with the present invention would be realized in combination with aspect 8. The dimension measurement method of aspect 9 further includes receiving input designating an area in which the candidate region (23) exists, by the computer. Additionally, the dimension measurement method of aspect 9 includes extracting the candidate region (23) from a designated area, by the computer.

The dimension measurement method of aspect 10 in accordance with the present invention would be realized in combination with aspect 8. The dimension measurement method of aspect 10 further includes extracting, as a land (24), a region which has the set of coordinates away from the focused surface (21) by a distance exceeding a reference value and is attached to the focused surface (21), so as to give one or more lands (24), by the computer. Additionally, the dimension measurement method of aspect 10 includes receiving input which is obtained through an interactive process to designate a land (24) which is one of the one or more lands (24) and corresponds to the object (22), by the computer. Additionally, the dimension measurement method of aspect 10 includes selecting a designated land (24) as the candidate region (23), by the computer.

The dimension measurement method of aspect 11 in accordance with the present invention would be realized in combination with aspect 7 or 8. The dimension measurement method of aspect 11 further includes extracting, as a land (24), a region which has the set of coordinates away from the focused surface (21) by a distance exceeding a reference value and is attached to the focused surface (21), so as to give one or more lands (24), by the computer. Additionally, the dimension measurement method of aspect 11 includes evaluating similarities between the one or more lands (24) and predetermined various types of reference shapes, by the computer. Additionally, the dimension measurement method of aspect 11 includes selecting, as the candidate region (23), a land which is one of the one or more lands (24) and fits to any of the reference shapes, and to select, as the edge, an outline of a reference shape which is one of the reference shapes and fits to this land (24), by the computer.

The dimension measurement method of aspect 12 in accordance with the present invention would be realized in combination with any one of aspects 7 to 11. The dimension measurement method of aspect 12 includes obtaining, when the measurement device (30) has a function to output color information for the set of coordinates, the set of coordinates together with the color information, by the computer. The dimension measurement method of aspect 12 includes regarding, as a set of coordinates of the candidate region (23), the set of coordinates associated with the color information which indicates a color included in predetermined colors, by the computer.

The dimension measurement system of aspect 13 in accordance with the present invention includes the dimension measurement device (10) of any one of aspects 1 to 6, and the measurement device (30). In summary, the dimension measurement system includes a measurement device (30), and the dimension measurement device (10) of any one of aspects 1 to 6 which is connected to the measurement device (30).

The program of aspect 14 in accordance with the present invention is a program that, when executed by a computer, allows the computer to function as a dimension measurement device (10). The dimension measurement device (10) includes: an obtainer (11) configured to obtain, from a measurement device (30) for performing three dimensional measurement of a desired object (20), a set of coordinates in three dimensions of the desired object (20); a surface extractor (12) configured to determine a focused surface (21) constituting the desired object (20) based on the set of coordinates, and extract a position of a boundary of the focused surface (21); a region extractor (13) configured to extract, in relation to a candidate region (23) corresponding to an object (22) being a specific object attached to the focused surface (21), a position of an edge surrounding the candidate region (23); and a dimension generator (14) configured to generate dimensional data necessary for creating a dimensional drawing of the desired object (20) from the position of the boundary and the position of the edge.

The computer-readable recording medium of aspect 15 in accordance with the present invention is a computer-readable recording medium storing a program that, when executed by a computer, allows the computer to function as a dimension measurement device (10). The dimension measurement device (10) includes: an obtainer (11) configured to obtain, from a measurement device (30) for performing three dimensional measurement of a desired object (20), a set of coordinates in three dimensions of the desired object (20); a surface extractor (12) configured to determine a focused surface (21) constituting the desired object (20) based on the set of coordinates, and extract a position of a boundary of the focused surface (21); a region extractor (13) configured to extract, in relation to a candidate region (23) corresponding to an object (22) being a specific object attached to the focused surface (21), a position of an edge surrounding the candidate region (23); and a dimension generator (14) configured to generate dimensional data necessary for creating a dimensional drawing of the desired object (20) from the position of the boundary and the position of the edge.

The invention claimed is:

1. A dimension measurement device comprising:
    an obtainer configured to obtain, from a measurement device for performing three dimensional measurement of a desired object, a set of coordinates in three dimensions of the desired object;
    a surface extractor configured to determine a focused surface constituting the desired object based on the set of coordinates, and extract a position of a boundary of the focused surface;
    a region extractor configured to extract, in relation to a candidate region corresponding to an object being a specific object which is different from the desired object and is attached to the focused surface, a position of an edge surrounding the candidate region, the region extractor being configured to distinguish the candidate region from the focused surface based on a difference between attributes of the focused surface and the candidate region to extract the position of the edge surrounding the candidate region; and
    a dimension generator configured to generate dimensional data necessary for creating a dimensional drawing of the desired object from the position of the boundary and the position of the edge.

2. The dimension measurement device of claim 1, further comprising an inputter having a function to receive input designating a type of the object from an input device,
    the dimension generator being configured to modify a position and one or more dimensions of the object relative to the position of the edge by use of information on the type of the object.

3. The dimension measurement device of claim 2, wherein:
    the inputter has a function to receive input designating an area in which the candidate region exists; and
    the region extractor is configured to extract the candidate region from the area designated by the inputter.

4. The dimension measurement device of claim 2, further comprising a land extractor configured to extract, as a land, a region which has the set of coordinates away from the focused surface by a distance exceeding a reference value and is attached to the focused surface, so as to give one or more lands,
    the inputter having a function to receive input which is obtained through an interactive process to designate a land which is one of the one or more lands and corresponds to the object, and
    the region extractor being configured to select the land designated by the inputter as the candidate region.

5. The dimension measurement device of claim 1, further comprising a land extractor configured to extract, as a land, a region which has the set of coordinates away from the focused surface by a distance exceeding a reference value and is attached to the focused surface, so as to give one or more lands,
the land extractor being configured to evaluate similarities between the one or more lands and predetermined various types of reference shapes, and
the region extractor being configured to select, as the candidate region, a land which is one of the one or more lands and fits to any of the reference shapes, and to select, as the edge, an outline of a reference shape which is one of the reference shapes and fits to this land.

6. The dimension measurement device of claim 1, wherein:
the obtainer has a function to, when the measurement device has a function to output color information for the set of coordinates, obtain the set of coordinates together with the color information; and
the region extractor has a function to regard, as a set of coordinates of the candidate region, the set of coordinates associated with the color information which indicates a color included in a predetermined range of colors.

7. A dimension measurement system comprising:
a measurement device; and
the dimension measurement device of claim 1, which is connected to the measurement device.

8. A dimension measurement method comprising:
obtaining, from a measurement device for performing three dimensional measurement of a desired object, a set of coordinates in three dimensions of the desired object, by a computer;
determining a focused surface constituting the desired object based on the set of coordinates and extracting a position of a boundary of the focused surface, by the computer;
extracting, in relation to a candidate region corresponding to an object being a specific object which is different from the desired object and is attached to the focused surface, a position of an edge surrounding the candidate region, by the computer; and
generating dimensional data necessary for creating a dimensional drawing of the desired object from the position of the boundary and the position of the edge, by the computer,
wherein the extracting includes distinguishing the candidate region from the focused surface based on a difference between attributes of the focused surface and the candidate region to extract the position of the edge surrounding the candidate region.

9. The dimension measurement method of claim 8, further comprising:
receiving input designating a type of the object, by the computer;
modifying a position and one or more dimensions of the object relative to the position of the edge by use of information on a designated type of the object, by the computer.

10. The dimension measurement method of claim 9, further comprising:
receiving input designating an area in which the candidate region exists, by the computer; and
extracting the candidate region from a designated area, by the computer.

11. The dimension measurement method of claim 9, further comprising:
extracting, as a land, a region which has the set of coordinates away from the focused surface by a distance exceeding a reference value and is attached to the focused surface, so as to give one or more lands, by the computer;
receiving input which is obtained through an interactive process to designate a land which is one of the one or more lands and corresponds to the object, by the computer; and
selecting a designated land as the candidate region, by the computer.

12. The dimension measurement method of claim 8, further comprising:
extracting, as a land, a region which has the set of coordinates away from the focused surface by a distance exceeding a reference value and is attached to the focused surface, so as to give one or ore lands, by the computer;
evaluating similarities between the one or more lands and predetermined various types of reference shapes, by the computer; and
selecting, as the candidate region, a land which is one of the one or more lands and fits to any of the reference shapes, and to select, as the edge, an outline of a reference shape which is one of the reference shapes and fits to this land, by the computer.

13. The dimension measurement method of claim 8, further comprising:
obtaining, when the measurement device has a function to output color information for the set of coordinates, the set of coordinates together with the color information, by the computer; and
regarding, as a set of coordinates of the candidate region, the set of coordinates associated with the color information which indicates a color included in predetermined colors, by the computer.

14. A non-transitory computer-readable recording medium storing a program that, when executed by a computer, allows the computer to function as a dimension measurement device,
the dimension measurement device comprising:
an obtainer configured to obtain, from a measurement device for performing three dimensional measurement of a desired object, a set of coordinates in three dimensions of the desired object;
a surface extractor configured to determine a focused surface constituting the desired object based on the set of coordinates, and extract a position of a boundary of the focused surface;
a region extractor configured to extract, in relation to a candidate region corresponding to an object being a specific object which is different from the desired object and is attached to the focused surface, a position of an edge surrounding the candidate region, the region extractor being configured to distinguish the candidate region from the focused surface based on a difference between attributes of the focused surface and the candidate region to extract the position of the edge surrounding the candidate region; and
a dimension generator configured to generate dimensional data necessary for creating a dimensional drawing of the desired object from the position of the boundary and the position of the edge.

* * * * *